(12) United States Patent
McGinn

(10) Patent No.: US 12,411,099 B2
(45) Date of Patent: Sep. 9, 2025

(54) SYSTEMS AND METHODS FOR DETECTING BEAM DISPLACEMENT

(71) Applicant: FEI Company, Hillsboro, OR (US)

(72) Inventor: James B McGinn, Portland, OR (US)

(73) Assignee: FEI Company, Hillsboro, OR (US)

( * ) Notice: Subject to any disclaimer, the term of this patent is extended or adjusted under 35 U.S.C. 154(b) by 505 days.

(21) Appl. No.: 18/051,170

(22) Filed: Oct. 31, 2022

(65) Prior Publication Data

US 2024/0110881 A1 Apr. 4, 2024

Related U.S. Application Data

(60) Provisional application No. 63/377,756, filed on Sep. 30, 2022.

(51) Int. Cl.
*G01N 23/2251* (2018.01)

(52) U.S. Cl.
CPC ..... *G01N 23/2251* (2013.01); *G01N 2223/07* (2013.01); *G01N 2223/418* (2013.01); *G01N 2223/507* (2013.01)

(58) Field of Classification Search
CPC ............... G01N 23/00; G01N 23/2251; G01N 2223/507; G01N 2223/418; G01N 2223/07; H01J 37/00; H01J 37/02; H01J 37/023; H01J 37/147; H01J 37/15; H01J 37/22; H01J 37/222; H01J 37/244; H01J 37/26; H01J 37/28
USPC ......................................... 250/306, 307, 311
See application file for complete search history.

(56) References Cited

U.S. PATENT DOCUMENTS

| | | | | |
|---|---|---|---|---|
| 4,897,545 | A * | 1/1990 | Danilatos | H01J 37/28 250/397 |
| 9,881,769 | B2 * | 1/2018 | Aoki | H01J 37/28 |
| 2012/0298864 | A1 * | 11/2012 | Morishita | H01J 37/244 250/310 |
| 2019/0033237 | A1 * | 1/2019 | Nakayama | G01T 1/17 |
| 2021/0319977 | A1 * | 10/2021 | Liu | H01J 37/1474 |

* cited by examiner

*Primary Examiner* — Jason L McCormack
(74) *Attorney, Agent, or Firm* — BakerHostetler

(57) ABSTRACT

Detectors, systems, and methods for detecting lateral beam displacement for a beam microscopy system are described herein. In one aspect, a detector can include an aperture for allowing a charged particle beam passing through the detector and irradiating a sample; and a plurality of rails arranged in a first plane extending radially outward from the aperture, wherein each of the plurality of rails is configured to detect charged particles from the charged particle beam before irradiating the sample.

20 Claims, 15 Drawing Sheets

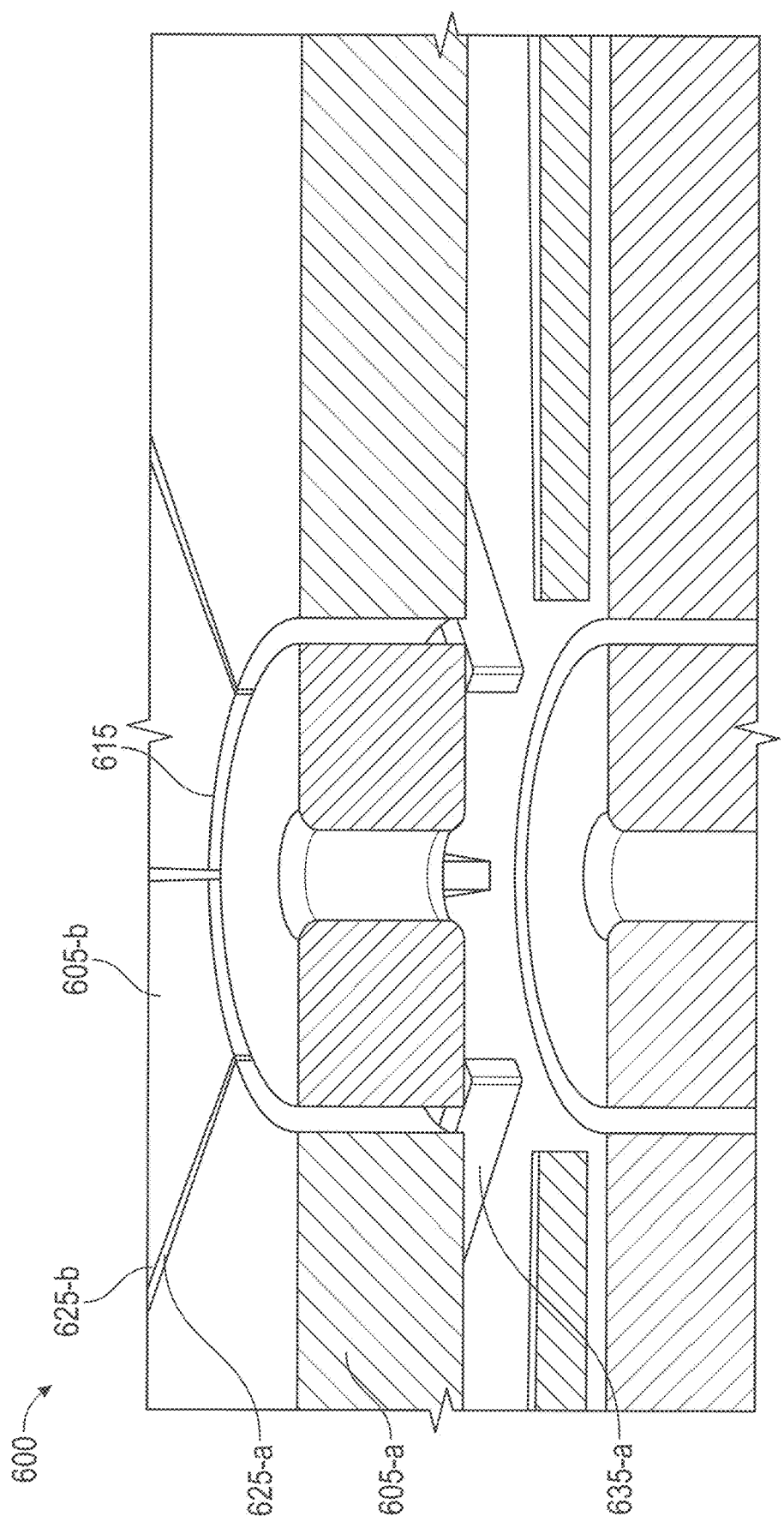

SYSTEMS AND METHODS FOR DETECTING BEAM DISPLACEMENT

CROSS-REFERENCE TO RELATED APPLICATIONS

This application claims benefit to U.S. Provisional Application No. 63/377,756, filed Sep. 30, 2022, the entirety of which is incorporated by reference herein.

TECHNICAL FIELD

This disclosure relates to systems and methods for detecting beam displacement in charged particle microscopes.

BACKGROUND

Common charged particle beam systems have charged particle sources that suffer from lateral positional drift. This drift can cause beam misalignment in linear beam systems, which can result in poor beam performance. Conventional techniques for identifying beam misalignment includes raster beam scanning and mapping, which can be inefficient, both during the scanning as well as during the scan processing.

SUMMARY

Lateral beam shift detectors for charged particle beam microscopes are described herein. A detector for measuring beam displacement of a charged particle beam in a charged particle microscope can include: an aperture for allowing the charged particle beam passing through the detector along a central axis of the detector and irradiating a sample; and a plurality of rails arranged in a first plane extending radially outward from the aperture, wherein each of the plurality of rails is configured to detect charged particles from the charged particle beam before irradiating the sample.

It should be understood that the summary above is provided to introduce in simplified form a selection of concepts that are further described in the detailed description. It is not meant to identify key of essential features of the claimed subject matter, the scope of which is defined uniquely by the claims that follow the detailed description. Furthermore, the claimed subject matter is not limited to implementations that solve any disadvantage noted above or in any part of this disclosure.

BRIEF DESCRIPTION OF THE DRAWINGS

FIG. 7 depicts a magnified cross-sectional perspective view of a detector;

DETAILED DESCRIPTION

Figure 1:
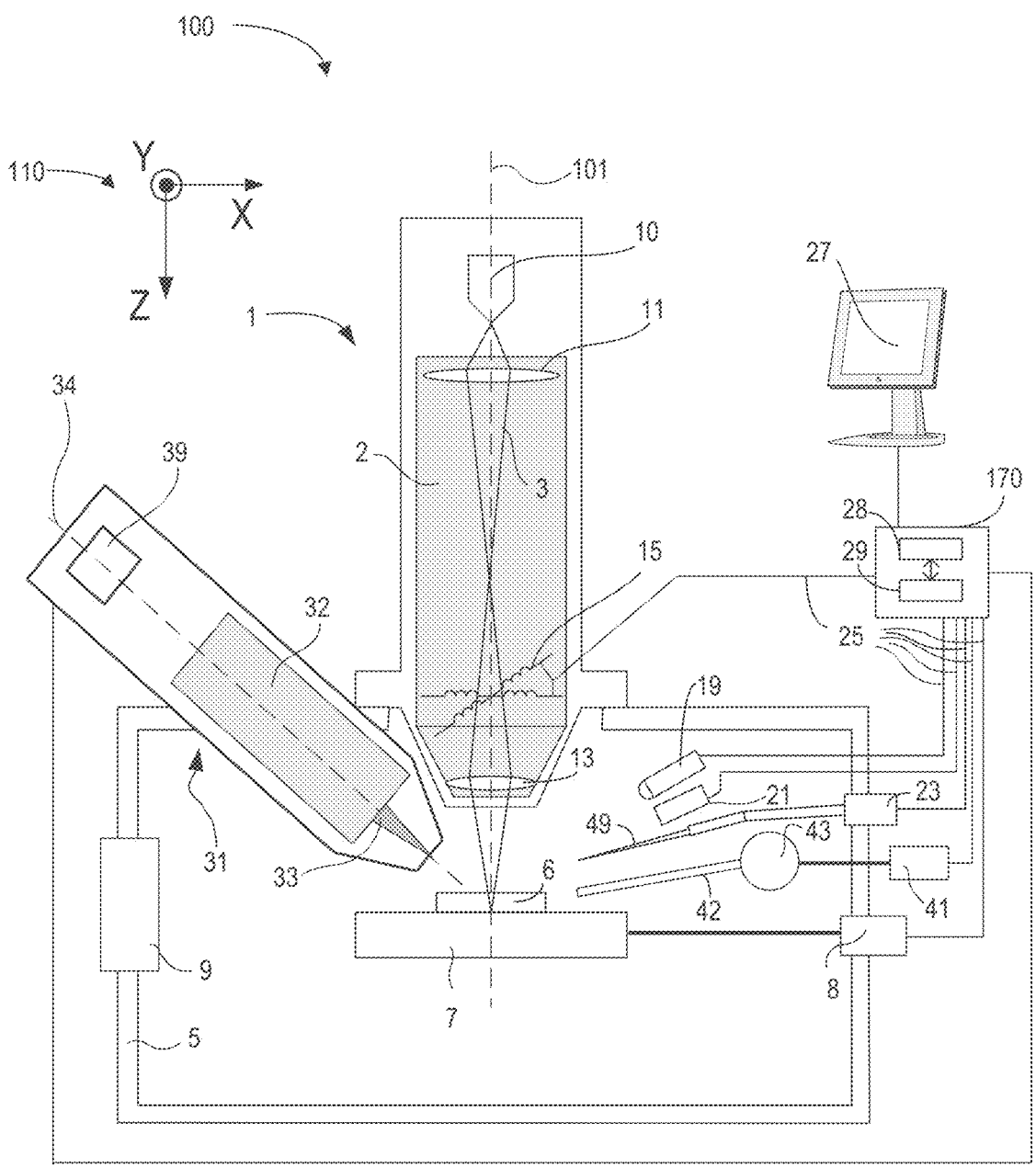
FIG. 1 depicts a microscopy system.

The present disclosure may be understood more readily by reference to the following detailed description of examples included therein.

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing. All publications, patent applications, patents and other references mentioned herein are incorporated by reference in their entirety. The materials, methods, and examples disclosed herein are illustrative only and not intended to be limiting.

The singular forms "a," "an," and "the" include plural referents unless the context clearly dictates otherwise.

As used in the specification and in the claims, the term "comprising" can include "consisting of" and "consisting essentially of" The terms "comprise(s)," "include(s)," "having," "has," "can," "contain(s)," and variants thereof, as used herein, are intended to be open-ended transitional phrases, terms, or words that require the presence of the named ingredients/steps and permit the presence of other ingredients/steps. However, such description should be construed as also describing compositions or processes as "consisting of" and "consisting essentially of" the enumerated ingredients/steps, which allows the presence of only the named ingredients/steps, along with any impurities that might result therefrom, and excludes other ingredients/steps.

As used herein, the terms "about" and "at or about" mean that the amount or value in question can be the value designated some other value approximately or about the same. It is generally understood, as used herein, that it is the nominal value indicated ±10% variation unless otherwise indicated or inferred. The term is intended to convey that similar values promote equivalent results or effects recited in the claims. That is, it is understood that amounts, sizes, formulations, parameters, and other quantities and characteristics are not and need not be exact, but can be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. It is understood that where "about" is used before a quantitative value, the parameter also includes the specific quantitative value itself, unless specifically stated otherwise.

Unless indicated to the contrary, the numerical values should be understood to include numerical values which are the same when reduced to the same number of significant figures and numerical values which differ from the stated value by less than the experimental error of conventional measurement technique of the type described in the present application to determine the value.

All ranges disclosed herein are inclusive of the recited endpoint and independently of the endpoints. The endpoints of the ranges and any values disclosed herein are not limited to the precise range or value; they are sufficiently imprecise to include values approximating these ranges and/or values.

As used herein, approximating language can be applied to modify any quantitative representation that can vary without resulting in a change in the basic function to which it is related. Accordingly, a value modified by a term or terms, such as "about" and "substantially," may not be limited to the precise value specified, in some cases. In at least some instances, the approximating language can correspond to the precision of an instrument for measuring the value. The modifier "about" should also be considered as disclosing the range defined by the absolute values of the two endpoints. For example, the expression "from about 2 to about 4" also discloses the range "from 2 to 4." The term "about" can refer to plus or minus 10% of the indicated number. For example, "about 10%" can indicate a range of 9% to 11%, and "about 1" can mean from 0.9-1.1. Other meanings of "about" can be apparent from the context, such as rounding off, so, for example "about 1" can also mean from 0.5 to 1.4. Further, the term "comprising" should be understood as having its open-ended meaning of "including," but the term also includes the closed meaning of the term "consisting." For example, a composition that comprises components A and B can be a composition that includes A, B, and other components, but can also be a composition made of A and B only. Any documents cited herein are incorporated by reference in their entireties for any and all purposes.

Lateral beam shift/displacement detectors for charged particle beam microscopes are described herein. The detector can include an aperture, and can be placed such that the charged particle beam generated by the microscope passes substantially through the aperture of the detector. The aperture can be centered at a central axis. The detector may be installed in a charged particle microscope so that the central axis of the detector is aligned with the optical axis of the charged particle microscope. The detector can further include a plurality of rails extending radially outward from the aperture in a plane orthogonal to the central axis. Each of the plurality of rails is configured to detect charged particles from the charged particle beam before the charged particle beam irradiates the sample. In some cases, the rails of the detector can be an electrical conductor that can collect portions of the charged particle beam that contacts the rail and transfers the charge to an electrical measuring device, such as a voltmeter. The collected electrical signals from the different rails of the detector can indicate which portions of the detector are receiving more of the charged particle beam, and thus, whether a lateral displacement of the charged particle beam exists for the microscope. In this way, lateral beam displacement may be detected and corrected before or during active use of the charged particle beam. In other words, the detector may be used for monitoring the beam alignment without interfering imaging the sample.

In some cases, the detector can further include one or more plates arranged in a plane orthogonal to the central axis. The plates can block at least a portion of the charged particle beam. In some cases, the rails are located in a first plane, and the one or more plates are in a second, parallel to the first plane. The second plane can be either above or below the first plane. The second plane is above the first plane when the detector is positioned in such a way that the charged particles generated from the source reach the second plane before reaching the first plane. For example, the second plane is between the charged particle source and the first plane. Similarly, the second plane is below the first plane when the detector is positioned so that the charged particles generated from the source reach the first plane before reaching the second plane.

In some cases, the plurality of plates are separated by a plurality of gaps or slits, and each of the plurality of rails corresponds to a different gap of the plurality of gaps. Each pair of adjacent plates can form a respective gap or slit between the two plates. A corresponding rail can be positioned under the gap or slit. In some cases, the rail can either directly or indirectly detect the charged particles. In some cases, the rails can indirectly detect the charged particles by detecting secondary electron emissions generated by the charged particle beam interacting with (e.g., coming in contact with) side surfaces of the detector plate (e.g., the sidewalls of the plate defining the slit).

In some cases, the rails may be light transmitters that are positioned below the plates of the detector. A light measuring device can be coupled to each of the one or more light transmitters. The light transmitters may include a light scintillator, which can receive electrical signals and convert the signals to respective light signals. In some cases, the slit between the adjacent plates is angled, such that a light transmitter is not directly exposed to the generated charged particle beam. The charged particle beam can interact with (e.g., come in contact with) the plate and generate secondary electron emissions. A portion of the secondary electron emissions can travel to a respective light transmitter, which can convert the electrical signal of the emissions (e.g., via a scintillator) to a light signal that being measured by a coupled light measuring device.

Figure 2:
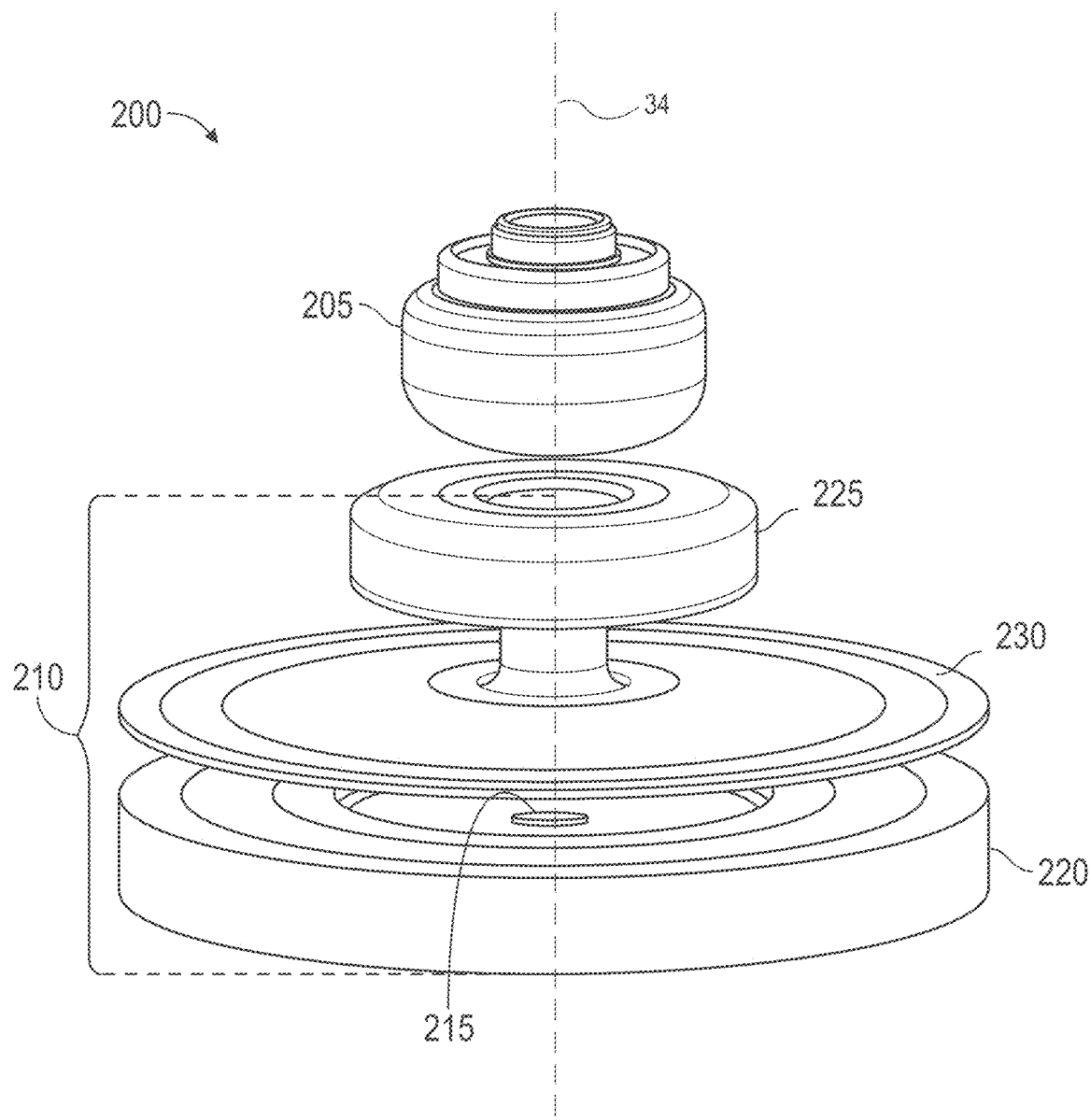
FIG. 2 depicts an example location of a beam-displacement detector in a microscopy system.
Figure 3:
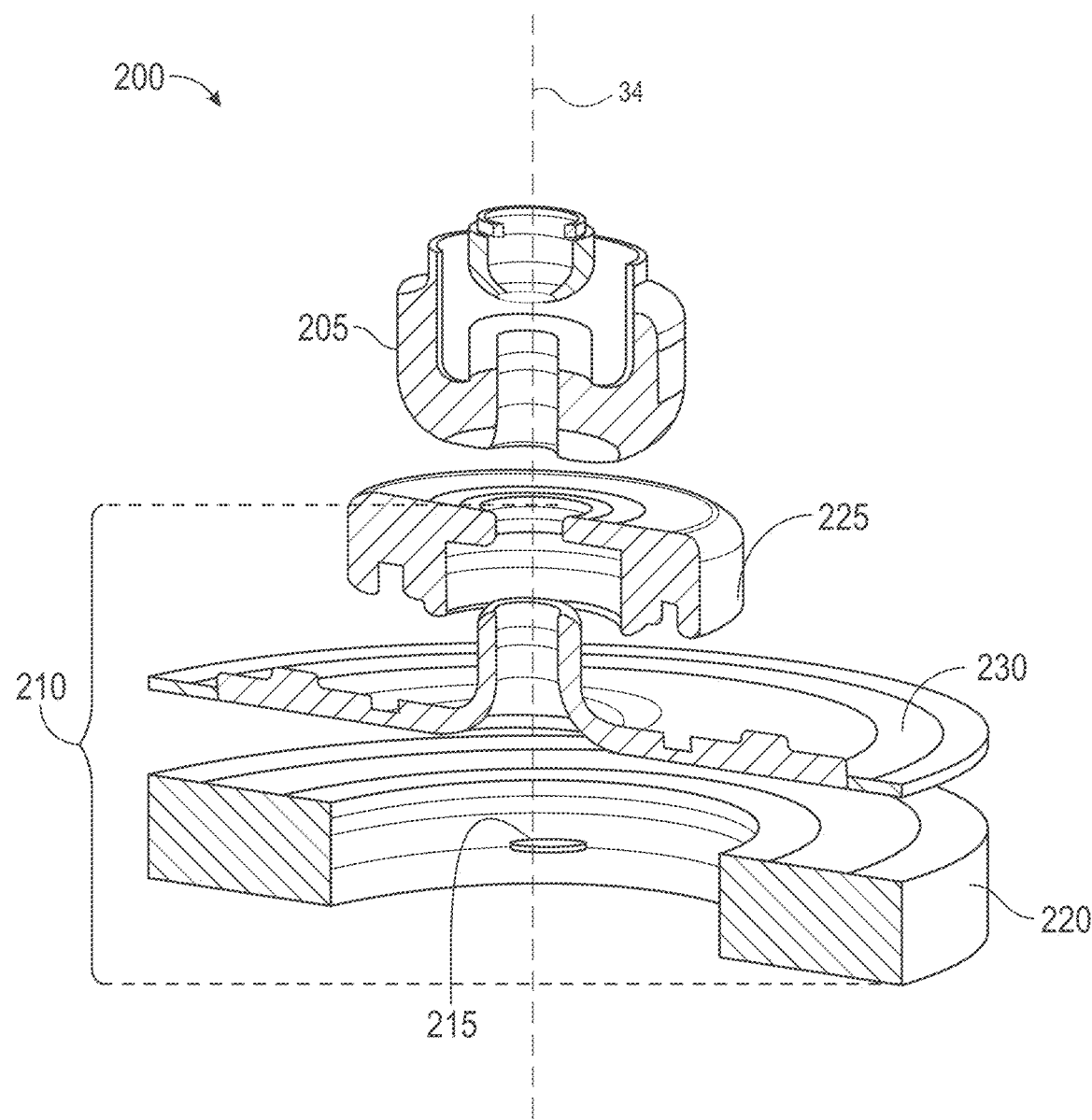
FIG. 3 depicts a cross-sectional view of FIG. 2.

The detector may be positioned in the column of the charged particle microscope, with its central axis aligned with the optical axis of the charged particle microscope. The detector may be used for aligning an electron beam or an ion beam. In one example, the detector may be positioned upstream of a column isolation valve (CIV). The CIV may be closed to block the charged particle beam, so that the charged particle beam cannot enter the sample chamber. The CIV may be closed during sample exchange or microscope calibration. The charged particle beam may be aligned using the detector when the CIV is closed. In one example, the detector is positioned upstream of the CIV in the ion column of a dual-beam system. The CIV is closed when the sample is irradiated with the electron beam. In yet another example, the detector is positioned within a lens of the optical column. For example, the detector may be positioned within the anode as shown in FIGS. 2-3.

The detector described herein allows for the detection of lateral beam displacement for charged particle microscopes. The process of detecting a lateral shift is time efficient compared to conventional processes. For example, beam position may be determined by a single reading of signals received from the rails. Based on a comparison of the readings from the rails, a direction and an amount of the lateral shift of the beam relative to the central axis of the detector can be determined. The beam positioned may be adjusted manually or automatically based on the determined direction and/or the lateral shift. The above-described beam alignment process can in some cases be performed during system calibration before imaging or processing a sample. The beam alignment may also be performed while the sample is imaged or processed without interrupting the operation of the microscope.

In one embodiment, a detector for measuring beam displacement of a charged particle beam in a charged particle microscope comprises an aperture for allowing the charged particle beam passing through the detector along a central axis of the detector and irradiating a sample; and a plurality of rails arranged in a first plane extending radially outward from the aperture, wherein each of the plurality of rails is configured to detect charged particles from the charged particle beam. In some cases, the first plane can be orthogonal to the central axis. In some cases, the rails can extend radially outward from the central axis.

In some cases, the detector can further comprise one or a plurality of plates arranged in a second plane orthogonal to the central axis for blocking charged particles of the charged particle beam. The plates can be positioned either above or below the rails. When the plates are positioned above the rails, the plates can reduce the amount of charged particles the rails receive, which can be especially important in cases where a large amount of secondary electrons are created by the charged particle beam interacting with the plate (e.g. due to too high of a current).

In some cases, the plurality of plates are separated by a plurality of gaps or slits, and each of the plurality of rails corresponds to a different gap of the plurality of gaps. The rails can be positioned below the plates such that the plates receive the charged particle beam prior to the rails, thereby reducing the amount of the beam that passes to the rails.

In some cases, each plate of the plurality of plates defines one or more side edges and an inner edge, wherein: the plurality of plates are disposed circumferentially about the central axis such that each side edge of each plate is separated from another side edge of another plate of the plurality of plates by a gap of the plurality of gaps; and the plurality of plates are further disposed such that the plurality of inner edges define the aperture.

In some cases, at least a portion of each of the plurality of rails radially overlaps with at least a portion of the corresponding gap.

In some cases, the charged particle beam crosses the second plane (i.e. the plane of the plates) before crossing the first plane (the plane of the rails), and wherein each of the plurality of rails is configured to detect the charged particles includes each of the plurality of rails is configured to detect one more of the charged particles entering the corresponding gap. As each rail can detect the charged particles, the amount each rail detects can indicate a lateral shift of the charged particle beam, particularly where the rails measure differing amounts of the charged particle beam.

In some cases, the gap is further defined such that a line drawn parallel to the central axis contacts a canted side edge of each corresponding plate defining the gap, without passing through the gap. The canted side edges can prevent the primary charged particle beam (i.e. charged particle beam generated by the charged particle source) from directly contacting the rails. Instead, the primary charged particle beam can contact the canted side edges, which can generate secondary electrons. These secondary electrons can be captured by the rails. As such, the primary charged particles cannot directly irradiate the rails. The rails detect the charged particle indirectly (e.g., via secondary electrons). This can further reduce the amount at which the beam contacts the rails.

In some cases, the side edges of the plurality of plates are non-parallel to the central axis, and wherein each of the plurality of rails is configured to detect the charged particles entering the corresponding gap, wherein each of the plurality of rails is configured to detect secondary electrons generated by the primary charged particles entering the corresponding gap contacting at least one of the side edges.

In some cases, the plurality of rails are scintillator optically transmissive rails. The rails can include a scintillating layer, (e.g., a scintillator coating the exterior of the rail), such that any portion of the beam contacting the scintillator is converted to a light signal. The light signal can then be transmitted through the rail to a coupled light detector (e.g., a photometer).

In some cases, the charged particle beam crosses the first plane before crossing the second plane. In some cases, the plurality of rails are electrically conductive.

In an example, a charged particle microscope can include: a charged particle source for generating a charged particle beam; the detector of discussed above, wherein the central axis of the aperture is aligned with an optical axis of the charged particle microscope; and a controller includes a processor and a non-transitory memory for storing computer readable instructions, wherein when the instructions are executed by the processor, the controller is configured to: receive signals from each of the plurality of rails of the detector; and determine, from the received signals, a displacement of the charged particle beam.

In some cases, the controller is further configured to: align the charged particle beam with the optical axis based on the displacement. In some cases, the charged particle microscope can include an actuator for adjusting a position of an emitter of the charged particle source, and wherein aligning the charged particle beam based on the displacement includes actuating the actuator based on the displacement.

In some cases, the charged particle microscope can further include one or more deflectors, wherein aligning the charged particle beam based on the displacement includes adjusting the one or more deflectors based on the displacement.

In some cases, the direction of the charged particle beam is aligned with the optical axis when each of the plurality of rails provides a substantially equal signal. In some cases, the charged particle microscope can further include a sample holder for holding a sample, and wherein the controller is configured to receive the signals from each of the plurality of rails of the detector while directing the charged particle beam towards the sample held by the sample holder.

In some cases, the charged particle microscope can further include one or more lenses or apertures, and wherein the controller is further configured to adjust the one or more lenses or apertures to increase a diameter of the charged particle beam at the detector before determining the displacement of the charged particle beam.

In some cases, the controller is further adapted and configured to activate the charged particle source, wherein the electrical signals are received from the detector during the activation. In some cases, the controller is further adapted and configured to activate the charged particle source, wherein the charged particle source is an ion source, and the detector is positioned between a condensing lens and an objective lens of the charged particle microscope.

Turning to FIG. 1, FIG. 1 is a highly schematic depiction of an embodiment of a dual-beam charged particle microscopy (CPM) system in which the present invention may be implemented; more specifically, it shows an embodiment of a FIB-SEM. System coordinates are shown as 110. Microscope 100 comprises an electron column 1, which produces a beam 3 of charged particles (in this case, an electron beam) that propagates along an electron-optical axis 101. Electron-optical axis 101 may be aligned with the Z axis of the system. The electron column 1 is mounted on a vacuum chamber 5, which comprises a sample stage 7 and associated actuator(s) 8 for holding/positioning a sample 6. Micromanipulator 49 may be actuated by actuator 23 for manipulating a sample/specimen, such as a small specimen extracted from sample 6. The vacuum chamber 5 is evacuated using vacuum pumps (not depicted). Also depicted is a vacuum port 9, which may be opened to introduce/remove items (components, samples) to/from the interior of vacuum chamber 5. Microscope 100 may comprise a plurality of such ports 9, if desired.

The column; 1 comprises an electron source 10 and an electron illuminator 2. This electron illuminator 2 comprises lenses 11 and 13 to focus the electron beam 3 onto the sample 6, and a deflection unit 15 (to perform beam steering/scanning of the beam 3). The microscope 100 further comprises a controller/computer processing apparatus 170 for controlling inter alia the deflection unit 15, lenses 11, 13, micro-manipulator 49, and detectors 19, 21, and displaying information gathered from the detectors 19, 21 on a display unit 27.

In addition to the electron column 1 described above, the microscope 100 also comprises an ion column 31. This comprises an ion source 39 and an ion illuminator 32, and these produce/direct an ion beam 33 along an ion-optical axis 34. To facilitate easy access to the sample, the ion axis 34 is canted relative to the electron axis 101. As hereabove described, such an ion (FIB) column 31 can, for example, be used to perform processing/machining operations on the sample 6, such as incising, milling, etching, depositing, etc. The ion column 31 can also be used to produce imagery of the sample 6. It should be noted that ion column 31 may be capable of generating various different species of ion at will; accordingly, references to ion beam 33 should not necessarily been seen as specifying a particular species in that beam at any given time—in other words, the beam 33 might comprise ion species A for operation A (such as milling) and ion species B for operation B (such as implanting), where species A and B can be selected from a variety of possible options. The ion source 39 may be a liquid metal ion source or a plasma ion source.

A detector for detecting a beam shift of the charged particle beams may be positioned in either or both of the electron column and the ion column, along the respective beam path before the beam interacts with the sample positioned on the sample stage.

Also illustrated is a Gas Injection System (GIS) 43, which can be used to effect localized injection of gases, such as etching or precursor gases, etc., for the purposes of performing gas-assisted etching or deposition. Such gases can be stored/buffered in a reservoir 41, and can be administered through a narrow nozzle 42, so as to emerge in the vicinity of the intersection of axes 101 and 34, for example.

The detectors 19, 21 are chosen from a variety of possible detector types that can be used to examine different types of "stimulated" radiation emanating from the sample 6 in response to irradiation by the (impinging) beam 3 and/or beam 33. Detector 19 may an X-ray detector, such as Silicon Drift Detector (SDD) or Silicon Lithium (Si(Li)) detector, for example. Detector 21 may be an electron detector in the form of a solid-state photomultiplier (SSPM) or evacuated photomultiplier tube (PMT) for example. This can be used to detect backscattered and/or secondary electrons emanating from the sample. The skilled artisan will understand that many different types of detectors can be chosen in a set-up such as that depicted, including, for example, an annular/segmented detector. By scanning the beam 3 or beam 33 over the sample 6, stimulated radiation—comprising, for example, X-rays, infrared/visible/ultraviolet light, secondary ions, secondary electrons (SEs) and/or backscattered electrons (BSEs)—emanates from the sample. Since such stimulated radiation is position-sensitive (due to said scanning motion), the information obtained from the detectors 19 and 21 will also be position-dependent.

The signals from the detectors 19 and 21 pass along control lines (buses) 25, are processed by the controller 170, and displayed on display unit 27. Such processing may include operations such as combining, integrating, subtracting, false coloring, edge enhancing, and other processing known to the skilled artisan. In addition, automated recognition processes may be included in such processing. The controller includes a non-transitory memory 29 for storing computer readable instructions and a processor 28. Methods disclosed herein may be implemented by executing the computer readable instructions in the processor. For example, the controller may control the microscope to mill and image the sample, collect data, and process the collected data for generating the 3D model of the features inside the sample. The controller may control the microscope to mill a sample mounted on a TEM grid, image the milled sample, and display the image on the display. The controller may adjust the ion beam energy by adjusting one or more lenses and/or the ion source. The controller may adjust the ion beam direction relative to the sample by adjusting either the sample orientation ang/or the optical parts in the ion column.

FIGS. 2-3 show an example location of the beam shift detector in the optical column of the charged particle microscope. FIG. 2 depicts a perspective view, and FIG. 3 depicts a cross-sectional perspective view, of a combination 200 including an extractor element 205 and a section 210 of an illuminator, according to the present disclosure. The illuminator may be either an electron illuminator 2 or an ion illuminator 32 shown in FIG. 1. As shown, a detector 215 can be located within an anode 220 of the illuminator. In some cases, the detector 215 can be located between a first lens 225 (e.g., an aperture lens) and a second lens 230 (e.g., an intermediate lens) of the illuminator. However, one skilled in the art will understand that the detector 215 can be located at other points of the microscopic column between the charged particle source and the sample. For example, the detector can be positioned between an anode 220 and a first lens, or between the charged particle source gun and the anode. In another example, the detector may be positioned upstream of the CIV. The CIV may be positioned within the body of the anode. The central axis of the beam shift detector may be aligned with either the ion-optical axis or the electron-optical axis for detecting ion beam or electron beam displacement.

In some embodiments, the charged particle source may include one or more optical parts downstream of the extractor. For example, the charged particle source includes the extractor and a condenser lens downstream of the extractor. The detector may be positioned in the source, downstream of the extractor.

Figure 4:
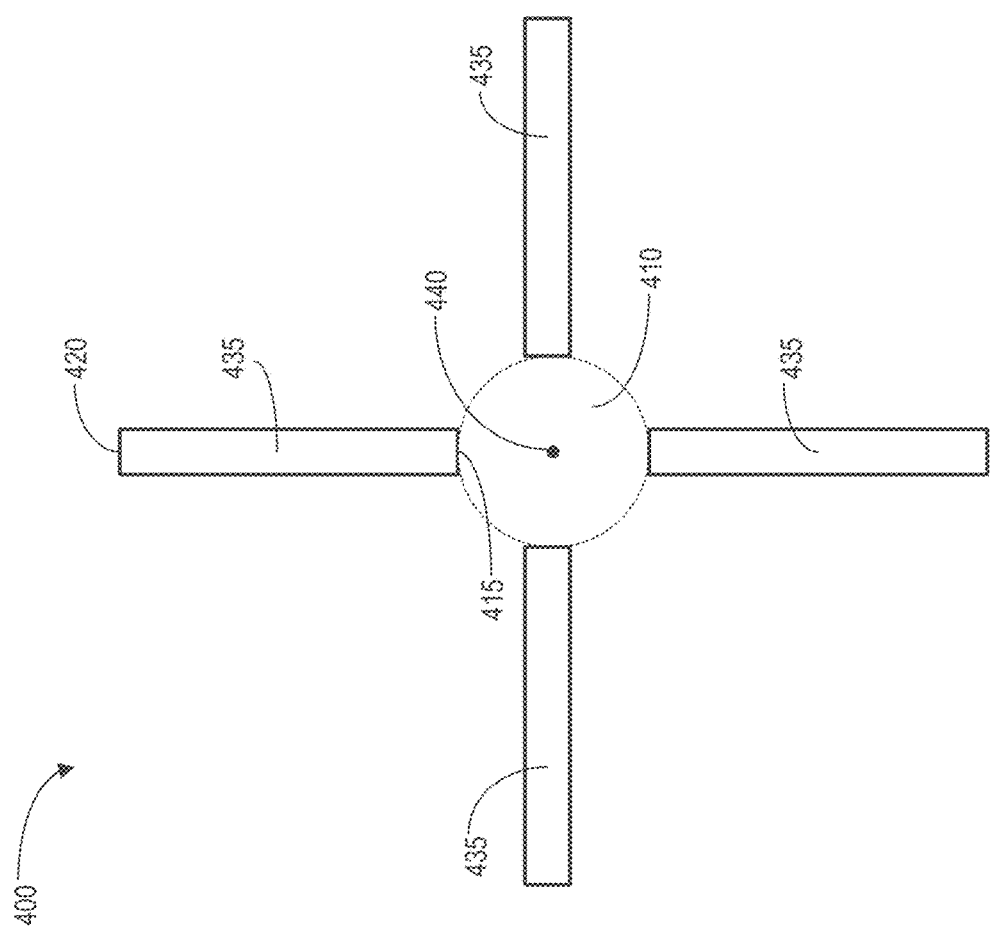
FIG. 4 depicts a perspective view of a detector.

FIG. 4 depicts an example of the beam shift detector 400 for detecting the beam shift, according to the present disclosure. The detector 400 can be an example of detector 215 as described with reference to FIGS. 2 and 3 and can be implemented with a microscopy system, such as system 100 as described with reference to FIG. 1.

The detector 400 can include multiple rails 435. The rails 435 can be further positioned such that the rails 435 define an aperture 410. The aperture is normal, or substantially normal, to a central axis 440 of the detector. Further, the dimensions of the aperture 410 can be determined based on the system configuration and the location of the detector in the microscope. For example, the aperture dimensions can be determined such that, when a sample is imaged or processed with the charged particle beam, the charged particles do not directly contact any of the rails 435 (e.g., the diameter of the aperture is slightly larger than the diameter of the charged particle beam). In other cases, the diameter of the aperture is equal to, or slightly smaller than, the diameter of the charged particle beam. Each rails 435 can be relatively identical in dimensions and composition to other rails 435, which can provide for a more even comparison of electrical readings originating from each respective rail. The aperture 410 may be substantially circular in shape. As shown in FIG. 4, each rail can thus form a section of an annulus, with the respective inner edges 415 forming the aperture 410 for the charged particle beam to pass through.

Further, the number of rails 435 of the detector can vary. In some cases, the number of rails 435 can be two for detecting beam displacement along one axis (such as x-axis). In other cases, the number of rails 435 can be four, as shown in FIG. 4, for determining a beam displacement along two axes. For example, beam displacement along two orthogonal axes (e.g., x-axis and y-axis) can be detected. One skilled in the art will understand that the number of rails can vary, and can be chosen based on the granularity of data one wishes to receive regarding beam displacement.

In the case of multiple rails 435 (as depicted in FIG. 4), each rail can be separated from another rail via a physical distance between adjacent rails, thereby forming a gap between the rails.

The rails 435 can be composed of an electrically conductive material. For example, various types of electrically conductive material can be suitable for the rails 435, such as various metals (e.g., copper, aluminum, iron, steel, and the like), or graphite.

The detector 400 can also be coupled to, or include, one or more electrical measuring devices (not shown). In some cases, the electrical measuring device (e.g., a voltmeter) can be connected to controller 170 as discussed with reference to FIG. 1. An electrical measuring device can be coupled, via electrical leads, to a respective rail 435. For example, each rail 435 can include its own dedicated electrical measuring device, or alternatively, an electrical measuring device can include multiple inputs, with each input corresponding to a separate rail 435. When a charged particle beam is generated and travels through the microscope column, any portion of the beam that contacts a rail 435 can electrically travel from the rail 435 to the electrical measuring device, which can convert the portion of the beam contacting the rail 435 to an electrical measurement. In some cases, the electrical measuring device can generate an electrical measurement based on input received at a predefined period of time (e.g., during the generation of a charged particle beam). In some cases, the predefined period of time can be synchronized across the electrical measuring devices and/or the inputs received for each respective plate.

The controller 170 can compare the electrical measurements received from the rails 435. For example, in a case of four rails 435, the controller 170 can compare four separate electrical measurements, where each measurement corresponds to a given rail 435. In the case where the rails are uniformly dimensioned, the controller 170 can determine that electrical measurements from the rails are indicative of a beam displacement in a lateral direction (e.g., where the measurement values for a given one or more rails are higher than the others).

In some cases, the controller 170 can also align the charged particle beam with the optical axis of the column based on the comparison. Following the above example, the controller can adjust the charged particle beam originating from the beam source 125 based on the comparison of the measurements. Thus, the controller 170 can perform an iterative beam adjustment for the system 100. In some cases, this beam measurement and adjustment processes can occur while the microscope is in use (e.g., imaging a sample).

Figure 5:
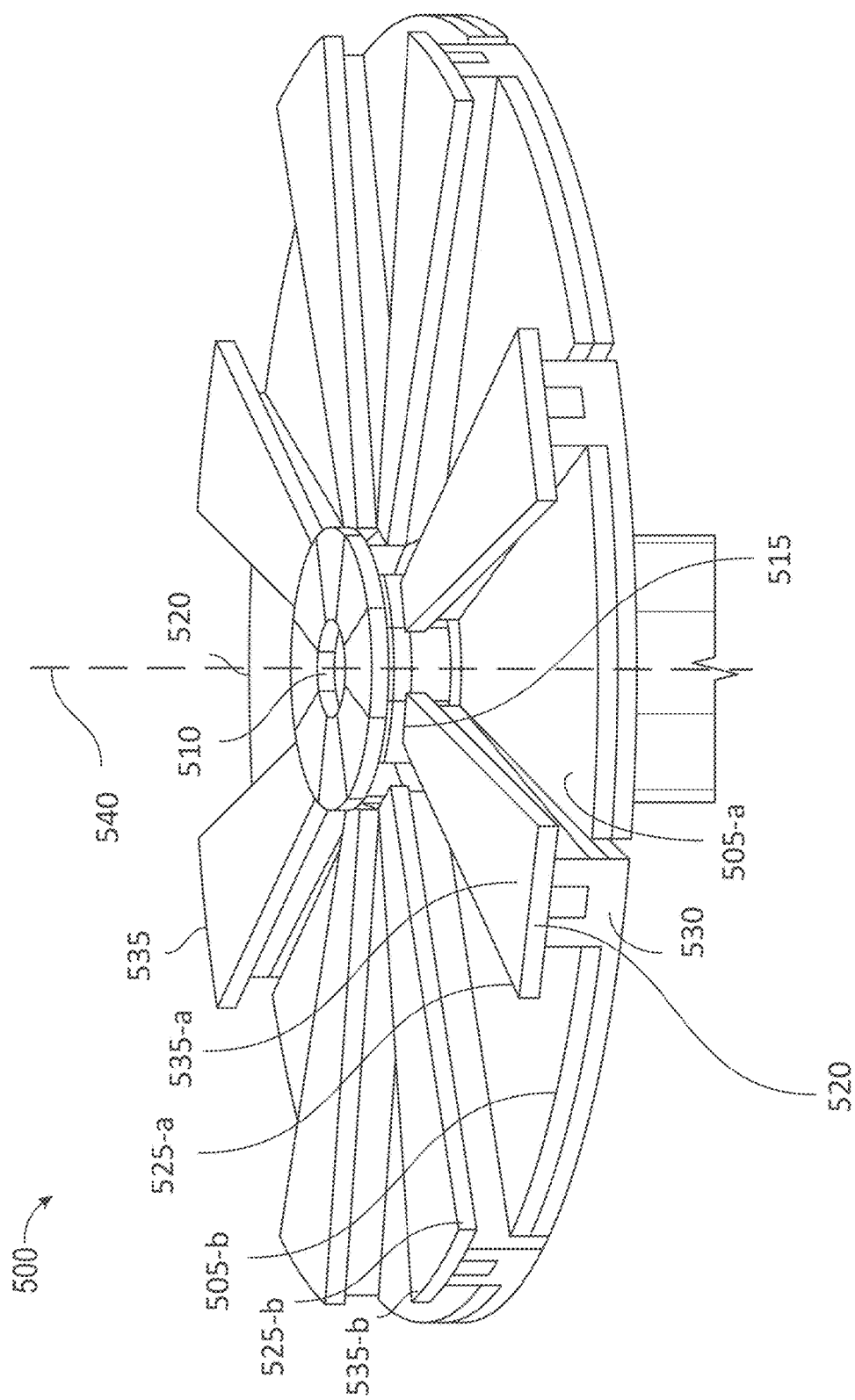
FIG. 5 depicts a perspective view of a detector.

FIG. 5 depicts an example of beam shift detector 500 for detecting beam displacement, according to the present disclosure. The detector 500 can be an example of detector 215 as described with reference to FIGS. 2 and 3, and can be implemented with a microscopy system, such as system 100 as described with reference to FIG. 1.

The detector can include one or more rails 535. The rails 535 can each be a thin layer of material and dimensioned to be located within a microscope column (e.g., of system 100). The detector includes an aperture normal, or substantially normal, to a central axis 540 of the detector. Further, the dimensions of the aperture 510 can be such that, when a sample is imaged or processed with the charged particle beam, the charged particle does not directly contact any of the rails 535 (e.g., the diameter of the aperture is slightly larger than the diameter of the charged particle beam). In other cases, the dimension of the aperture 510 can be determined based on the system configuration and the location of the detector in the microscope. For example, the diameter of the aperture is equal to, or slightly smaller than, the diameter of the charged particle beam.

In some cases, the rails 535 can include an inner edge 515 that is smaller in size than an outer edge 520. This can be beneficial, for example, when electrical contacts (e.g., to an electrical measuring device) are coupled to the outer edge 520 of a given rail 535, which can provide a larger coupling surface for the contacts, as well as to provide a larger surface distribution of any electrical charge that contacts a given rail (e.g., from a charged particle beam). Further, in some cases each rail 535 can be relatively identical in dimensions and composition to other rails 535, which can provide for a more even comparison of electrical readings originating from each respective rail. The aperture 510 may be substantially circular in shape.

Further, the number of rails 535 of the detector can vary. In some cases, the number of rails 535 can be one, such that the rails 535 can form a continuous sheet of material normal to the charged particle beam. In other cases, the number of rails 535 can be four, which can be useful in determining a direction of lateral beam displacement (e.g., x-direction, negative x-direction, y-direction, negative y-direction). As depicted in FIG. 5, the number of rails 535 can be eight. One skilled in the art will understand that the number of rails can vary, and can be chosen based on the granularity of data one wishes to receive regarding beam displacement.

In the case of multiple rails 535 (as depicted in FIG. 5), each rail 535 can be separated from another rail via a physical distance between adjacent rails, via an insulating layer, or both. As depicted in FIG. 5, side edge 525-*a* of rail 535-*a* has a physical distance from side edge 525-*b* of rail 535-*b*. However, an insulating layer 530 can also be positioned between edge 525-*a* and 525-*b*.

The rails 535 can be composed of an electrically conductive material. For example, various types of electrically conductive material can be suitable for the rails 535, such as various metals (e.g., copper, aluminum, iron, steel, and the like), or graphite. Likewise, insulation 530 can be composed of various insulating materials, such as ceramic, glass, epoxy plastic, and the like.

The detector 500 can also include one or more conductive plates 505. The plates 505 can further assist in electrically isolating adjacent rails 535. The plates 505 can be arranged in a second plane orthogonal to the central axis 540. The plates 505 can also be composed of an electrically conductive material (e.g., either the same material as the rails 535, or a different electrically conductive material). However, the plates 505 may act as an electrical shield, where any charged particle beam portion coming in contact with a plate 505 can disperse through the body of the plate 505. For example, the plates 505 can be voltage biased in order to capture secondary electrons created by the primary particle beam, such that background signals potentially caused by the secondary electrons is mitigated. Further, the rails 535 are electrically insulated from the plates 505 by the insulating layers 530.

The rails 535 can be positioned to overlap adjacent edges 525 of adjacent plates 505. For example, rail 535-a can be positioned over an edge of plate 505-a and an edge of plate 505-b (e.g., with respect to the direction of travel of the charged particle beam).

Similar to detector 400, the detector 500 can also be coupled to, or include, one or more electrical measuring devices (not shown). In some cases, the electrical measuring device (e.g., a voltmeter) can be connected controller 170 as discussed with reference to FIG. 1. The charged particle beam can be aligned based on readings from the rails.

Figure 6A:
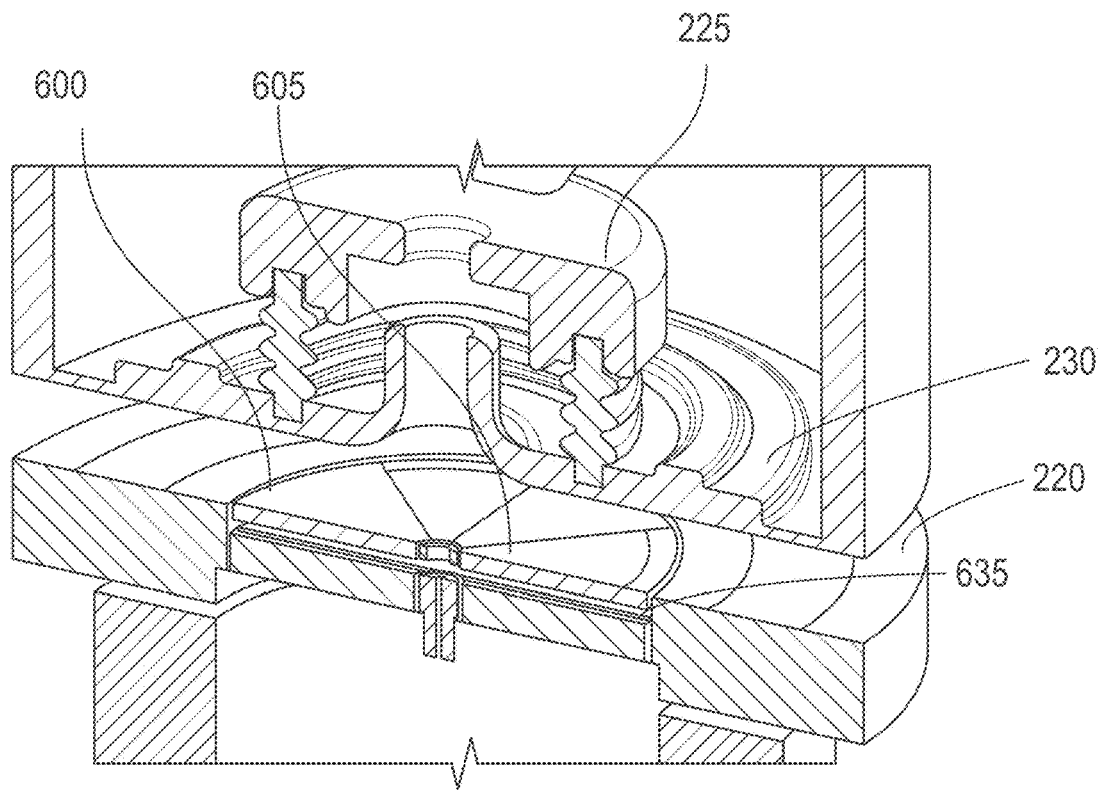
FIGS. 6A, 6B, 6C and 6D depict cross-sectional perspective views of detectors.
Figure 6B:
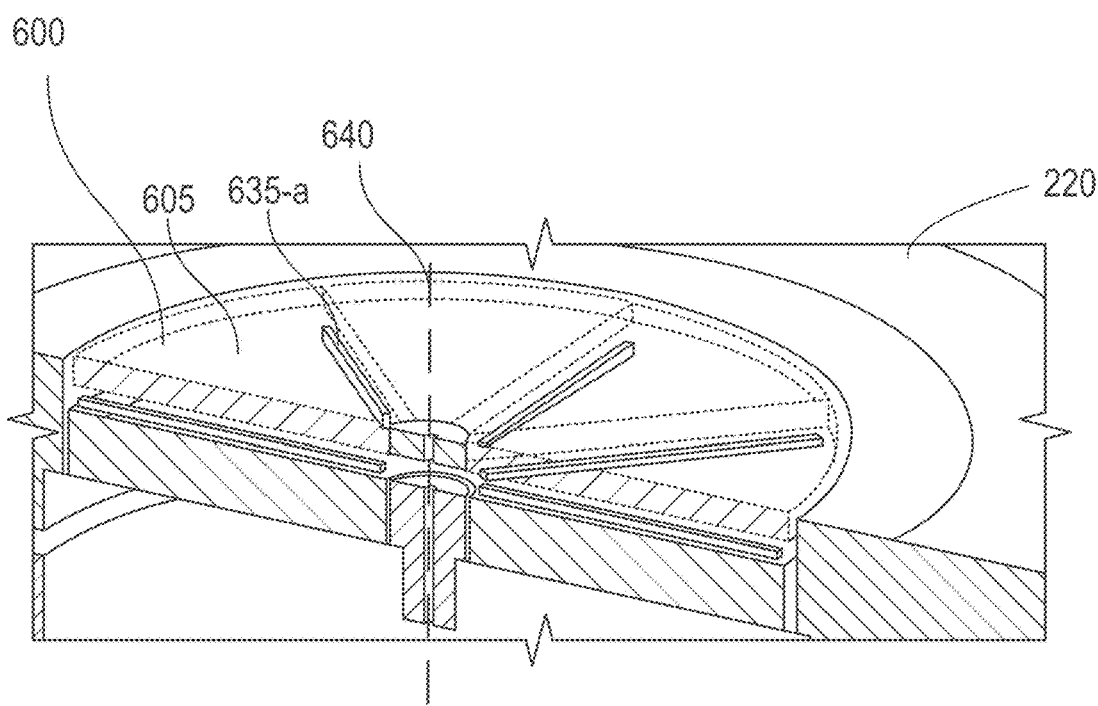
Figure 6C:
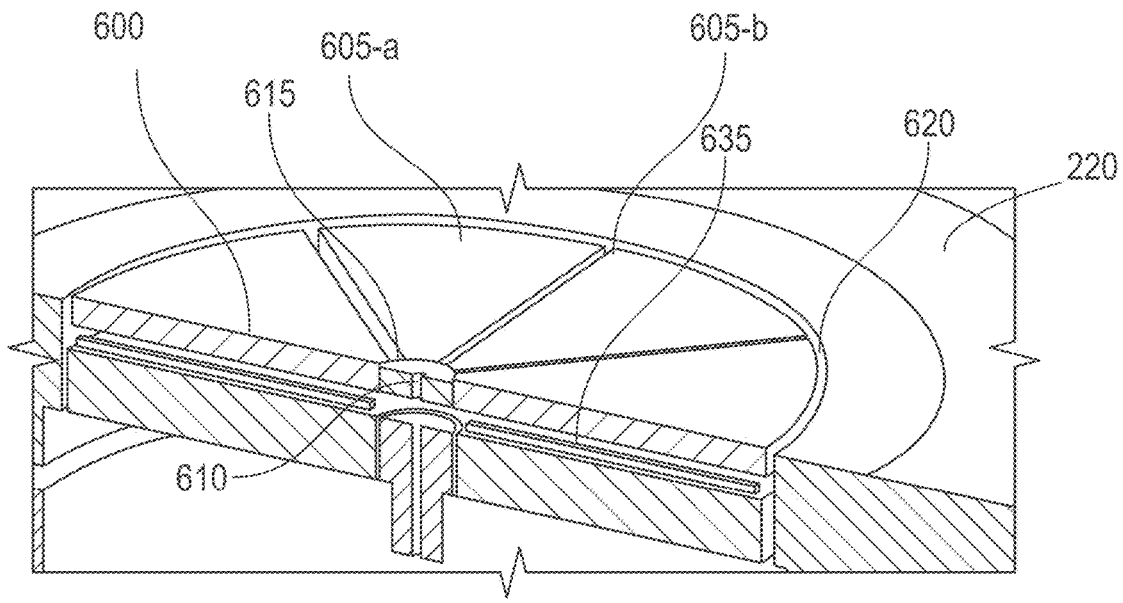
Figure 6D:
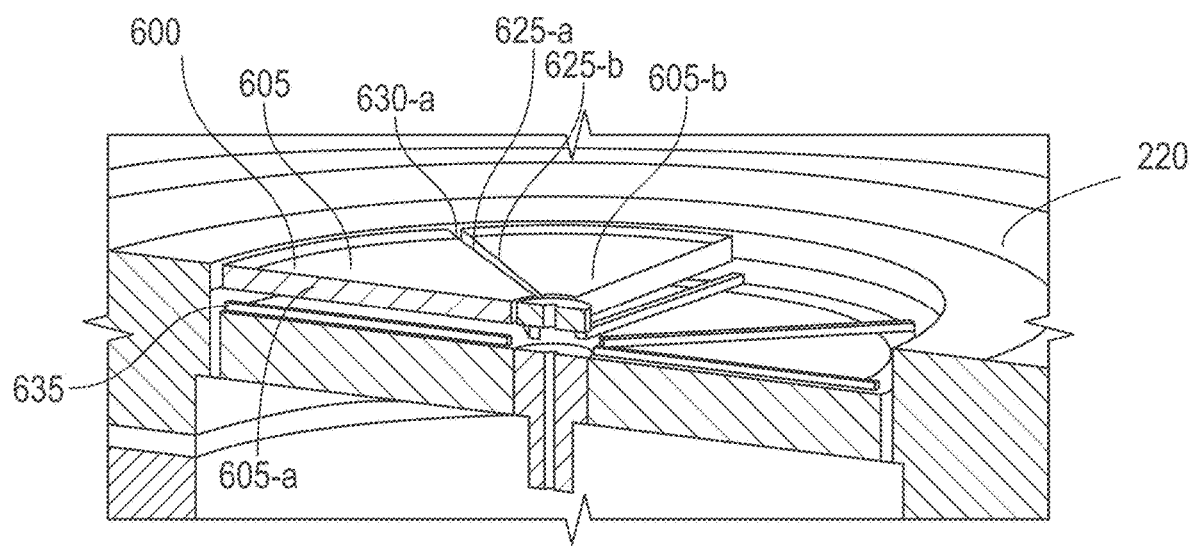
Figure 8:
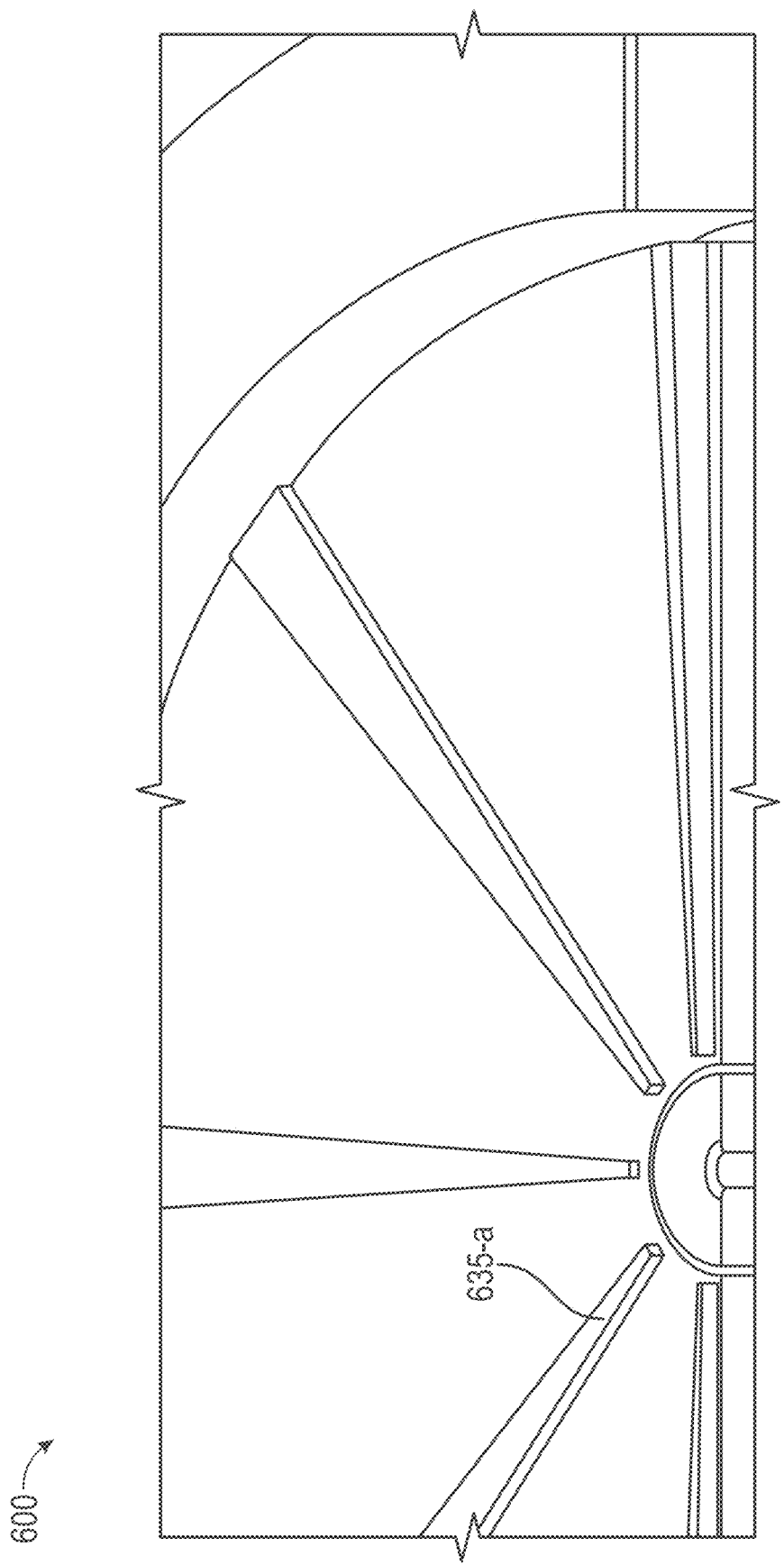
FIG. 8 depicts a magnified perspective view of a detector.

FIGS. 6A-6D, FIG. 7 and FIG. 8 depict perspective views of an example beam shift detector 600 for detecting beam displacement according to the present disclosure. FIG. 6A shows detector 600 positioned relative to anode 220, first lens 225, and second lens 230 as also depicted in FIGS. 2 and 3. FIG. 6B is a zoomed-in view of detector 600, wherein the plates are indicated with dashed line to show the rails below the plates. FIG. 6C is a zoomed-in view of detector 600. FIG. 6D shows the detector 600, with some of the plates 605 removed to show the rails below the plates. FIG. 7 is a further zoomed-in view of detector 600, showing the arrangements of plates and rails. FIG. 8 shows detector 600 from another angle relative to FIG. 7, along with plates removed to illustrate the rails 635. The detector 600 can be an example of detector 215 as described with reference to FIGS. 2 and 3, and can be implemented with a microscopy system, such as system 100 as described with reference to FIG. 1.

The detector 600 can include a plurality of plates 605 above a plurality of rails 635. The plates 605 can each be a thin layer of material and dimensioned to be located within a microscope column (e.g., of system 100). The plates 605 can be further positioned such that the plates 605 define an aperture 610. The aperture 610 can be positioned to be normal, or substantially normal, to a central axis 640 of the detector. Further, the dimensions of the aperture 510 can be determined based on the system configuration and the location of the detector in the microscope. For example, the aperture dimensions can be determined such that, when normal to the charged particle beam, the charged particle does not directly contact any of the plates 605 (e.g., the diameter of the aperture is slightly larger than the diameter of the charged particle beam. In other cases, the dimension of the aperture 610 can be such that, when normal to the charged particle beam, a portion of the charged particle beam contacts a portion of the plates 605 (e.g., the diameter of the aperture is equal to, or slightly smaller than, the diameter of the charged particle beam.

In some cases, the plates 605 can include an inner edge 615 that is smaller in size than an outer edge 620. Further, in some cases each plate 605 can be relatively identical in dimensions to other plates 605.

Likewise, the detector 600 includes an aperture 610 that is generally circular in shape. As shown in FIGS. 6A-6D and FIGS. 7-8, each plate can form a section of an annulus surrounding the aperture. The number of plates 605 of the detector can vary. In some cases, the number of plates 605 can be as low as two, such that the plates 605 form two gaps or slits for passage of portions of the charged particle beam to contact respective rails. In other cases, the number of plates 605 can be four, which can be useful in determining a direction of lateral beam displacement (e.g., x-direction, negative x-direction, y-direction, negative y-direction). As depicted in FIGS. 6A-6D and FIGS. 7-8, the number of plates 605 can be eight. One skilled in the art will understand that the number of plates can vary, and can be chosen based on the granularity of data one wishes to receive regarding beam displacement.

Each plate 605 can be separated from another plate via a physical distance between adjacent plates, thereby forming a gap or slit 630. As depicted in FIGS. 6A-6D and FIGS. 7-8, side edge 625-a of plate 605-a has a physical distance from side edge 625-b of plate 605-b, thereby forming gap or slit 630-a.

The plates 605 may be composed of an electrically conductive material. For example, various types of electrically conductive material can be suitable for the plates 605, such as various metals (e.g., copper, aluminum, iron, steel, and the like), or graphite. The plates 605 can facilitate electrical isolation of the corresponding rails 635 described below.

The detector 600 includes one or more conductive rails 635. The rails 635 are composed of an electrically conductive material (e.g., either the same material as the plates 605, or a different electrically conductive material). The rails 635 can be arranged in a second plane orthogonal to the central axis 640, below the first plane wherein the plates are positioned.

The rails 635 can be positioned below a respective gap or slit 630. For example, rail 635-a can be positioned below slit 630-a (with respect to the direction of travel of the charged particle beam. Thus, when a charged particle beam travels and makes contact with the detector 600, the plates 605-a and 605-b can limit the amount of the charged particle beam that travels through slit 630-a and contact rail 635-a. The rails 635 may be cylinders, beams, or in other shapes.

Similar to detectors 400 and 500, the detector 600 can also be coupled to, or include, one or more electrical measuring devices (not shown). In some cases, the electrical measuring device (e.g., a voltmeter) can be connected to controller 170 as discussed with reference to FIG. 1 for aligning the charged particle beam.

Figure 9:
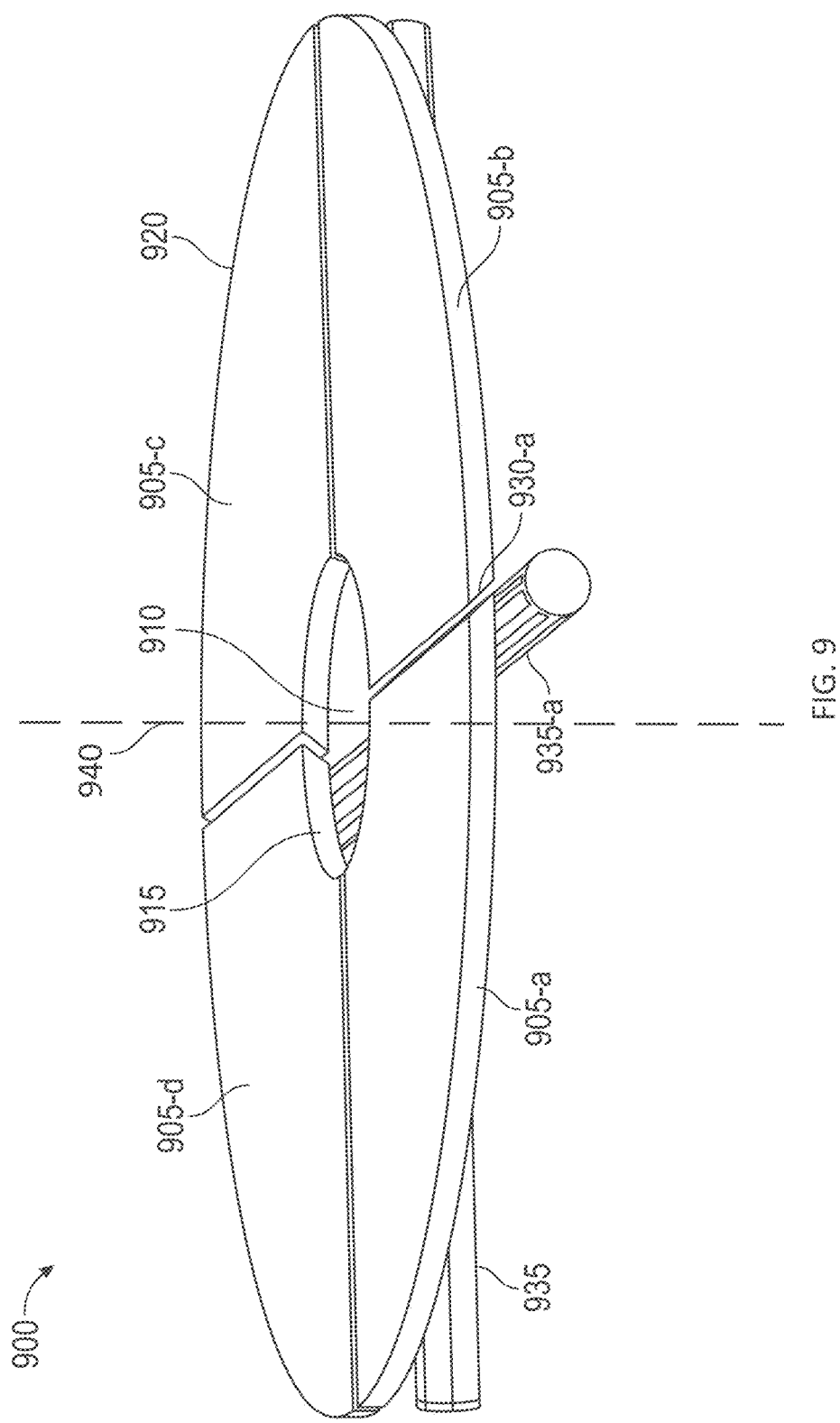
FIG. 9 depicts a perspective view of a detector.
Figure 10:
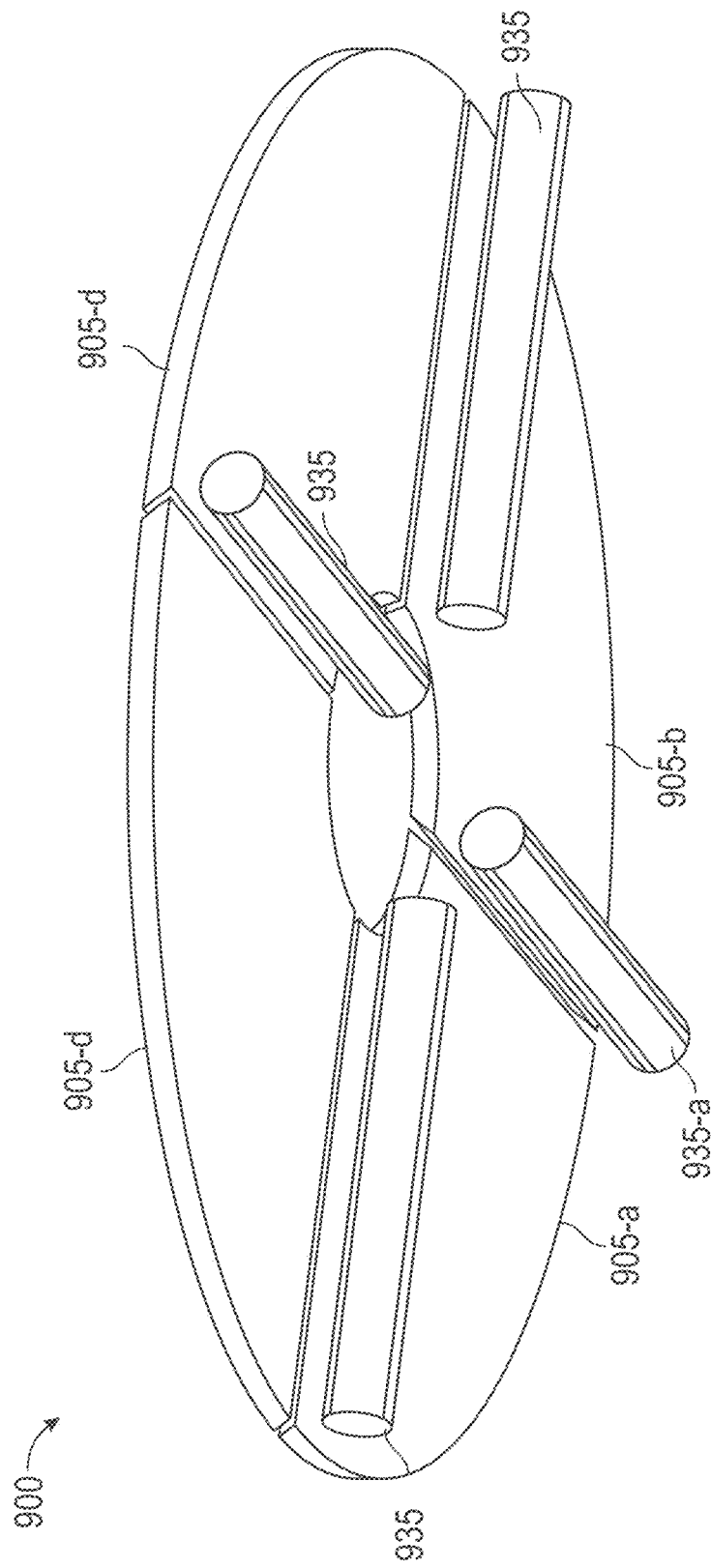
FIG. 10 depicts a perspective view of a detector.
Figure 11:
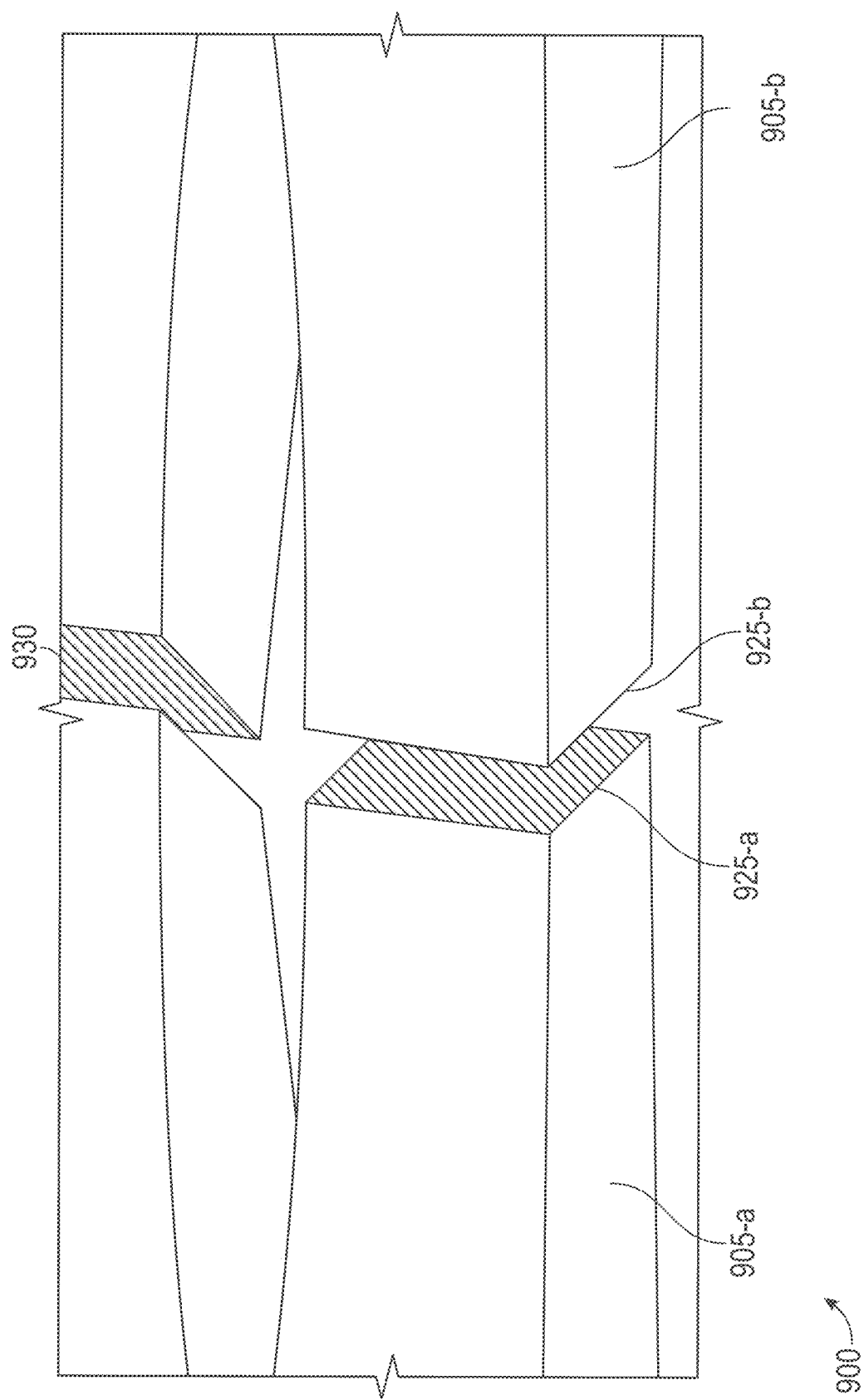
FIG. 11 depicts a magnified perspective view of a detector.
Figure 12:
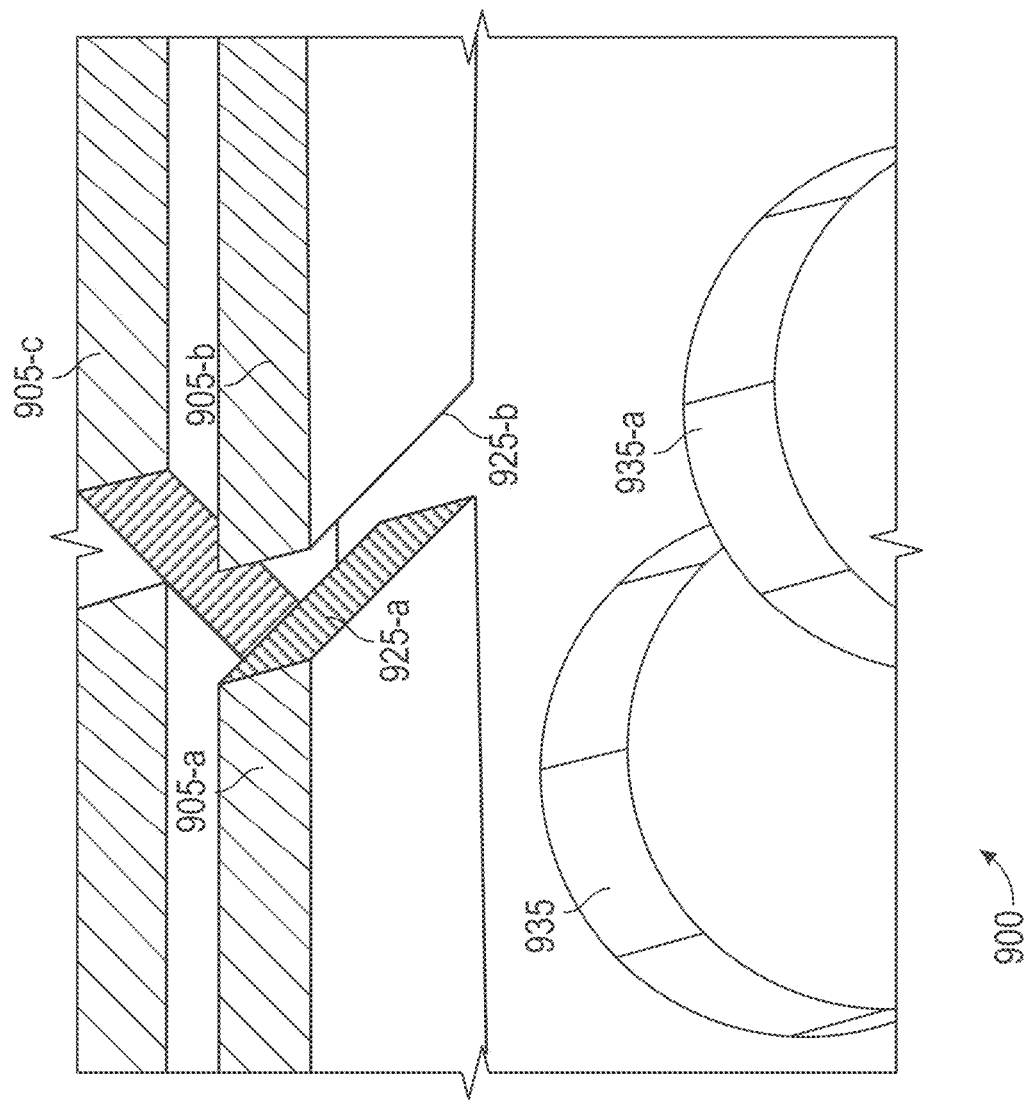
FIG. 12 depicts a magnified perspective view of a detector.

FIGS. 9-12 depict perspective views of a beam shift detector 900 for detecting beam displacement according to the present disclosure. FIGS. 9-10 are different views of detector 900. FIGS. 11-12 are zoomed-in views of detector 900 showing the gaps between plates and the rails. Detector 900 does not directly measure charged particle impinging the rails as detectors 400, 500, and 600. Rather, detector 900 indirectly detecting secondary electrons generated by the beam impinging the plates. The detector 900 can be an example of detector 215 as described with reference to FIGS. 2 and 3, and can be implemented with a microscopy system, such as system 100 as described with reference to FIG. 1.

The detector 900 can include a plurality of plates 905 (a-d). The plates 905 can each be a thin layer of material and dimensioned to be located within a microscope column (e.g., of system 100). The plates 905 can be further positioned such that the plates 905 define an aperture 910. The aperture can be positioned to be normal, or substantially normal, to a charged particle beam emitted from the charged particle source of the microscopy system. Further, the dimensions of the aperture 910 can be such that, when the sample is imaged or processed by the charged particle beam, the charged particle beam does not directly contact any of the plates 905 (e.g., the diameter of the aperture is slightly larger than the diameter of the charged particle beam). In other cases, the dimension of the aperture 910 can be such that, when normal to the charged particle beam, a portion of the charged particle beam contacts a portion of the plates 905 (e.g., the diameter of the aperture is equal to, or slightly smaller than, the diameter of the charged particle beam.

In some cases, the plates 905 can include an inner edge 915 that is smaller in size than an outer edge 920. Further, in some cases each plate 905 can be relatively identical in dimensions to other plates 905.

The aperture 910 may be substantially circular in shape. As shown in FIG. 9, each plate can form a section of an annulus, with the respective inner edges 915 forming the aperture 910 for the charged particle beam to pass through.

Further, the number of plates 905 of the detector can vary. In some cases, the number of plates 905 can be as low as two, such that the plates 905 form two slits for passage of portions of the charged particle beam to contact respective rails. In other cases, the number of plates 905 can be four, which can be useful in determining a direction of lateral beam displacement (e.g., x-direction, negative x-direction, y-direction, negative y-direction). One skilled in the art will understand that the number of plates can vary, and can be chosen based on the granularity of data one wishes to receive regarding beam displacement.

Each plate 905 can be separated from another plate via a physical distance between adjacent plates, thereby forming a slit 930. As depicted in more detail in FIG. 11, side edge 925-a of plate 905-a has a physical distance from side edge 925-b of plate 905-b, thereby forming slit 930-a.

The plates 905 can be composed of an electrically conductive material. For example, various types of electrically conductive material can be suitable for the plates 905, such as various metals (e.g., copper, aluminum, iron, steel, and the like), or graphite. The plates 905 can facilitate electrical isolation of the corresponding light channels 935 described below.

The detector 900 includes one or more rails 935 for detecting charged particle beam. The rails 935 may include scintillator coated light channels capable of carrying a light signal through the length of the channel. For example, the light channel can be an optical fiber. The rails 935 can be arranged in a second plane orthogonal to the central axis 940. The scintillator may convert radiation, such as electrons, into light signals. Thus, if the charged particles, such as electrons, reach rails 935, light is generated and travels through the light channel. The light may be detected by an optical detector optically coupled to the light channel.

The rails 935 can be positioned below a respective gap 930. For example, rails 935-a can be positioned below gap 930-a (with respect to the direction of travel of the charged particle beam). Thus, when a charged particle beam travels and makes contact with the detector 900, the plates 905-a and 905-b can limit the amount of the charged particle beam that travels through gap 930-a. Further, in some cases, projections of the side edges of adjacent plates that form a corresponding gap in a plane normal to the central axis 940 are partially overlapped. This overlap of the projections can be seen in FIGS. 11 and 12. For example, a bottom portion of side edge 925-a extends azimuthally further than a top portion of side edge 925-a. Likewise, a top portion of side edge 925-b extends azimuthally further than a bottom portion of side edge 925-b, thereby forming angled side edges 925-a and 925-b relative to the central axis 940. As such, each side-edges of all plates are angled relative to the central axis 945. In other words, the side-edges form a none-zero angle relative to the central axis. The angling can increase the interaction of the charged particle beam with the side edges. The angling can also mitigate the exposure of the rails 935 to direct exposure of the charged particle beam. For example, the projections of adjacent side edges (such as 925-a and 925-b) in a plane normal to the central axis can overlap to such a degree that the underlying rail 935 is not exposed directly to the charged particle beam.

In one example, the detector 900 is used for detecting ion beam displacement. Responsive to ion impinging the side edges 925 of plate 905, secondary electrons are generated and travel along the gap formed by the side edges. The secondary electrons exiting the gap may reach the rails 935 positioned under the plates 905. The scintillator material on the rails 935 convert the electron radiation into light. Light travels along the light rail of the rails 935 and is collected by an optical detector coupled to the rails 935. Each rail 935 can include its own dedicated optical detector, or alternatively, an optical detector can include multiple inputs, with each input corresponding to a separate rail 935. The controller 170 can compare the light measurements received from the rails 935 to determine a lateral direction and amount of beam displacement.

Similar as the detectors presented above, detector 900 can be positioned within a column of the microscope and connected to the controller for aligning the charged particle beam.

Figure 13:
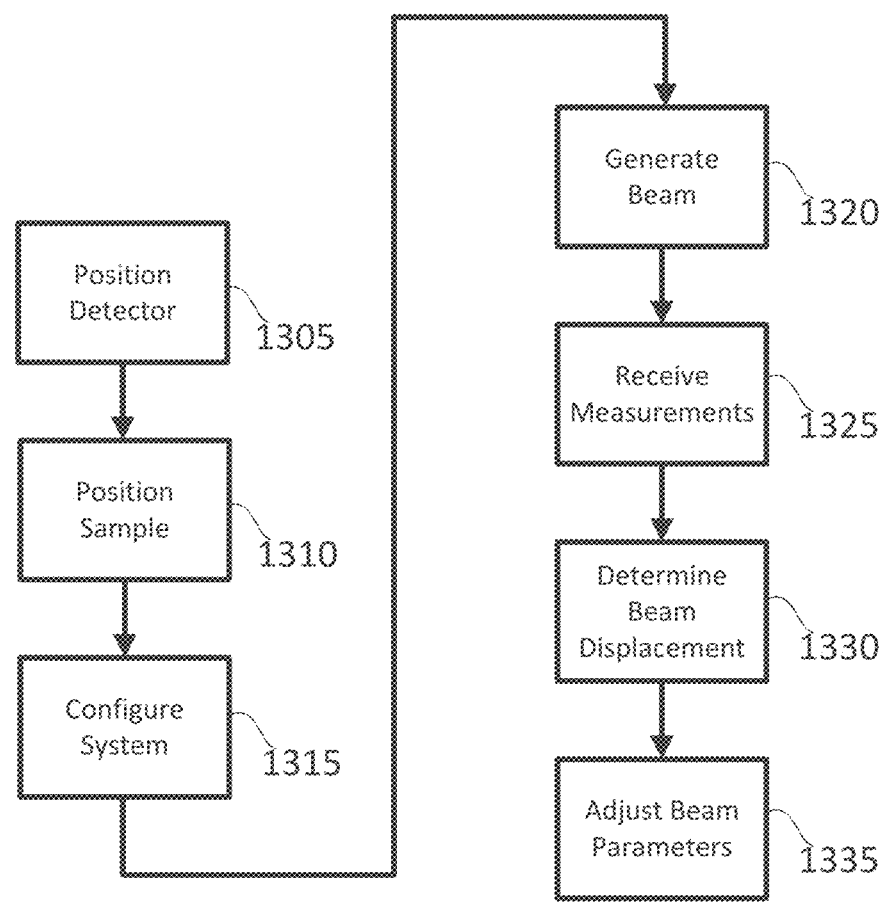
FIG. 13 depicts a process flow for detecting a lateral beam shift in a beam microscope.

FIG. 13 depicts a process flow for detecting and correcting a lateral beam shift in a beam microscope. In some cases, the process can be implemented by a microscopy system, such as system 100 as described with reference to FIG. 1. In some cases, the process can be implemented in part by a beam shift detector, such as the detectors shown in FIGS. 4-12.

At Step 1305, a detector can be positioned within a beam microscope. The central axis of the detector is aligned with the optical axis of the column. In some cases, the detector can be positioned at a particular location within the column of the microscopy system. For example, the detector can be positioned within an anode of the microscopy system. In some cases, the detector can be positioned between various lenses of the illuminator, such that a generated beam partially passes through the defined aperture of the detector. In some cases, the detector can be electrically coupled to a controller of the microscopy system (e.g., to communicate electrical or light signals from the detector). In some cases, a signal measuring device (e.g., a voltmeter, a photometer, and the like) can be a part of the detector, in which the measuring device can be electrically coupled to the microscopy system controller. In some cases, the detector can be positioned within the microscopy column during manufacture of the column, or can be integrated within a component of the column, such as an anode.

At Step 1310, a sample can optionally be positioned within the column of the microscopy system. For example, a sample can be positioned onto a sample stage (e.g., sample stage 7 of FIG. 1). The sample can be positioned for imaging by the microscopy system.

At Step 1315, components of the microscopy system can be adjusted to adjust a beam direction and/or size. In some cases, a deflector or deflectors of the microscopy system can be adjusted (e.g., calibrated) prior to generating a beam. For example, the deflector or deflectors (e.g., deflector 140) can be adjusted such that a generated beam substantially passes through the microscopy column (e.g. to ultimately contact a sample). In some cases, condenser lenses (e.g., electromagnetic lenses) can be adjusted prior to generating a charged beam. In some cases, a beam width can be increased (e.g., for increase contact with the detector) or reduced (e.g., for decrease contact with the detector) via adjusting deflectors and/or lenses.

At Step 1320, the microscopy system can generate a charged particle beam. The charged particle beam can be generated from a beam source, such as charged particle source of system 100. In some cases, the charged particle beam can be an ion beam or an electron beam. In some cases, the generated beam can irradiate the sample, and the irradiation can be captured by the microscopy column for sample imagining.

At Step 1325, the microscopy system can receive measurements (e.g., via a controller) from the detector for detecting the beam displacement. In some cases, the generated charged particle beam can partially contact the detector. Based on the configuration of the detector, as well as the degree of misalignment of the beam, the reading from the each rail of the detector may vary. For example, if the charged particle beam is aligned with the central axis of the detector, the readings from all rails are zero.

Figure 14:
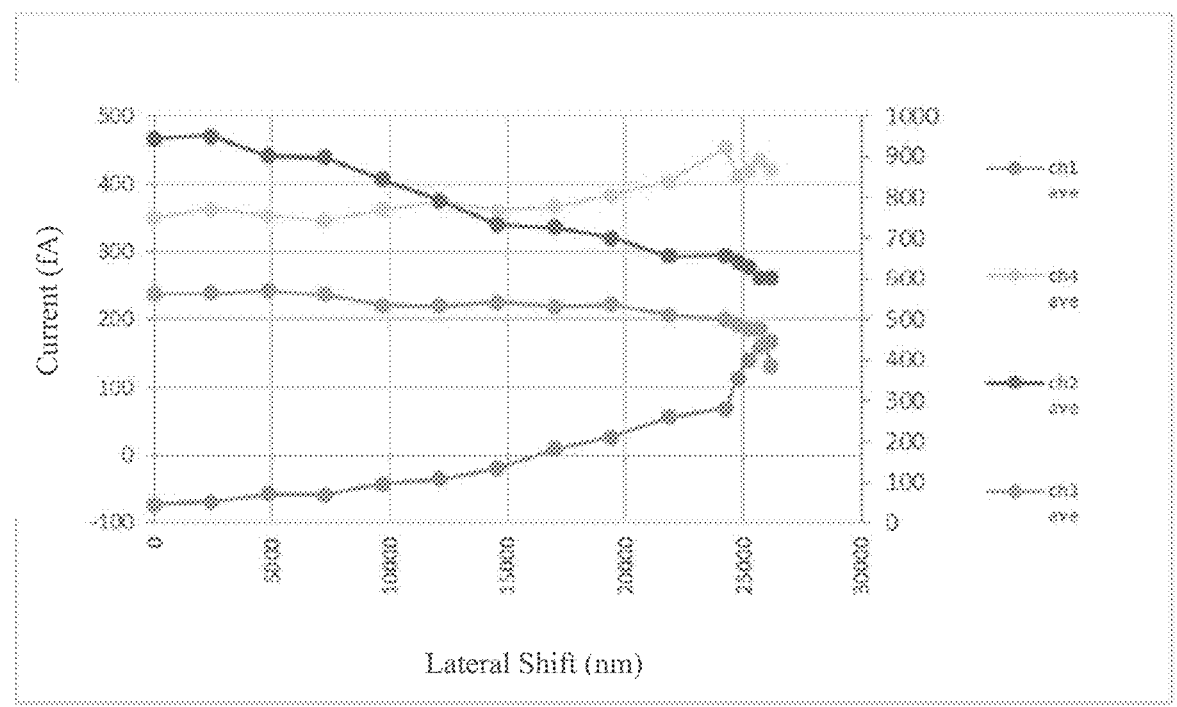
FIG. 14 depicts a graph of electrical measurement values versus beam position for a four-rail detector.

At Step 1330, the microscopy system can determine a beam displacement of the generated beam based on the received measurements. In some cases, the microscopy system (e.g., via a controller or manually) can compare the amplitude of the multiple electrical measurements. For example, in the case where the detector includes four rails, the microscopy system can compare the four electrical measurements received from the rails. If a difference between any two measurements exceeds a predefined threshold, the system can determine that a lateral displacement exists for the generated beam. For example, FIG. 14 depicts currents detected from each rail of a detector including four rails when an ion beam was laterally shifted. The rails are evenly spaced around the central axis of the detector. The x-axis indicates the amount of lateral shift, and the y-axis indicates the amount of current. As the beam was laterally shifted by adjusting a lens or mirror of the microscope, the currents detected from the rails change. As the beam was shifted towards the central axis of the detector, the currents from the rails converge. As such, based on the measurements, the system can identify the beam position, as well as a lateral displacement from the central axis. The controller can adjust the beam direction so that the measurements converge in values.

In some cases, the electrical measurements can be compared to stored values. If the electrical measurement exceeds the store value by a predefined threshold, the system can determine a lateral displacement exists. This can be particularly useful in the cases where the detector includes one rail, which provide a single electrical measurement.

At Step 1335, the microscopy system can adjust the charged particle beam, such as the beam position at the detector location, based on the beam displacement determined at 1330. The adjustment can occur based on the determination that a lateral displacement exists for the generated beam. In some cases, the beam is adjusted so that the readings from the rails are reduced. In some cases, the beam is adjusted so that the readings from multiple rails converge. The position of the charged particle beam may be adjusted by adjusting the beam direction via adjusting one or more components of the illuminator, such as the deflector. The beam position may be alternatively or additionally adjusted by adjusting the physical position of the charged particle source. For example, the charged particle source may be laterally moved by operating an actuator connected to the source.

In some cases, the beam position may be adjusted before loading the sample into the microscope for imaging or processing. In some cases, the beam position may be monitored and adjusted after loading the sample into the microscope.

In some cases, for aligning the beam, the beam width may be increased before 1325, for example by adjusting the condenser lenses, so that the rails to the beam-displacement detector can receive stronger signals for accurately determining the beam position. After adjusting the beam position at 1335, the beam width may be reduced for imaging/processing the sample.

Further, in some cases, Steps 1325-1335 can be repeated, thereby creating an iterative measuring and adjusting process. Further, the sample can continue to be imaged during while beam displacement is being measured and adjusted.

The invention has been described in detail, but it will be understood that variations and modifications can be effected within the scope of the invention as described above, by a person of ordinary skill in the art, without departing from the scope of the invention.

What is claimed:

1. A detector for measuring beam displacement of a charged particle beam in a charged particle microscope, comprising:
    an aperture centered at a central axis of the detector for allowing the charged particle beam passing through the detector and irradiating a sample; and
    a plurality of rails arranged in a first plane extending radially outward from the aperture, wherein each of the plurality of rails is configured to detect charged particles from the charged particle beam before irradiating the sample.

2. The detector of claim 1, further comprising one or a plurality of plates arranged in a second plane orthogonal to the central axis for blocking charged particles of the charged particle beam.

3. The detector of claim 2, wherein the plurality of plates are separated by a plurality of gaps, and each of the plurality of rails corresponds to a different gap of the plurality of gaps.

4. The detector of claim 3, wherein each plate of the plurality of plates defines one or more side edges and an inner edge, wherein:
    the plurality of plates are disposed circumferentially about the central axis such that a side edge of each plate is separated from another side edge of another plate of the plurality of plates by a gap of the plurality of gaps; and
    the plurality of plates are further disposed such that the plurality of inner edges define the aperture.

5. The detector of claim 3, wherein at least a portion of each of the plurality of rails radially overlaps with at least a portion of the corresponding gap.

6. The detector of claim 3, wherein the charged particle beam crosses the second plane before crossing the first plane, and wherein each of the plurality of rails is configured to detect one more of the charged particles entering the rail's corresponding gap.

7. The detector of claim 6, wherein the gap is further defined such that a line drawn parallel to the central axis contacts a canted side edge of each corresponding plate defining the gap, without passing through the gap.

8. The detector of claim 6, wherein the side edges of the plurality of plates are non-parallel to the central axis, and wherein each of the plurality of rails is configured to detect secondary electrons formed by the charged particles entering the corresponding gap contacting at least one of the side edges.

9. The detector of claim 8, wherein the plurality of rails are scintillator optically transmissive rails.

10. The detector of claim 3, wherein the charged particle beam crosses the first plane before crossing the second plane.

11. The detector of claim 1, wherein the plurality of rails are electrically conductive.

12. A charged particle microscope, comprising:
a charged particle source for generating a charged particle beam;
the detector of claim 1, wherein the central axis of the aperture is aligned with an optical axis of the charged particle microscope; and
a controller that includes a processor and a non-transitory memory for storing computer readable instructions, wherein when the instructions are executed by the processor, the controller is configured to:
receive signals from each of the plurality of rails of the detector; and
determine, from the received signals, a displacement of the charged particle beam.

13. The charged particle microscope of claim 12, wherein the controller is further configured to align the charged particle beam with the optical axis based on the displacement.

14. The charged particle microscope of claim 13, further comprising an actuator for adjusting a position of an emitter of the charged particle source, and wherein aligning the charged particle beam based on the displacement includes actuating the actuator based on the displacement.

15. The charged particle microscope of claim 13, further comprising one or more deflectors, wherein aligning the charged particle beam based on the displacement includes adjusting the one or more deflectors based on the displacement.

16. The charged particle microscope of claim 13, wherein the direction of the charged particle beam is aligned with the optical axis when each of the plurality of rails provides a substantially equal signal.

17. The charged particle microscope of claim 12, further comprising a sample holder for holding a sample, and wherein the controller is configured to receive the signals from each of the plurality of rails of the detector while directing the charged particle beam towards the sample held by the sample holder.

18. The charged particle microscope of claim 12, further comprising one or more lenses, and wherein the controller is further configured to adjust the one or more lenses to increase a diameter of the charged particle beam at the detector before determining the displacement of the charged particle beam.

19. The charged particle microscope of claim 12, wherein the controller is further configured to activate the charged particle source, wherein the electrical signals are received from the detector during the activation.

20. The charged particle microscope of claim 12, further comprising a column isolation valve, the detector is positioned upstream of the column isolation valve.

* * * * *